(12) United States Patent
Han (10) Patent No.: US 7,499,291 B2
(45) Date of Patent: Mar. 3, 2009

(54) DC POWER TRANSMISSION SYSTEM OF VOLTAGE SOURCE CONVERTER USING PULSE-INTERLEAVING AUXILIARY CIRCUIT

(75) Inventor: Byung Moon Han, Seoul (KR)

(73) Assignee: Myongji University Industry and Academia Cooperation Foundation, Gyeonggi-Do (KR)

( * ) Notice: Subject to any disclaimer, the term of this patent is extended or adjusted under 35 U.S.C. 154(b) by 0 days.

(21) Appl. No.: 11/652,983

(22) Filed: Jan. 12, 2007

(65) Prior Publication Data

US 2008/0007978 A1 Jan. 10, 2008

(30) Foreign Application Priority Data

Jul. 6, 2006 (KR) ............... 10-2006-0063336

(51) Int. Cl.
H02M 3/335 (2006.01)
H02M 5/45 (2006.01)
H02M 3/24 (2006.01)
(52) U.S. Cl. ............... 363/17; 363/37; 363/98
(58) Field of Classification Search ............ 363/17, 363/35, 37, 98
See application file for complete search history.

(56) References Cited

U.S. PATENT DOCUMENTS 5,703,767 A * 12/1997 Stacey .................. 363/40

6,307,760 B1 * 10/2001 Ikimi .................... 363/39
7,050,311 B2 * 5/2006 Lai et al. ............... 363/37

OTHER PUBLICATIONS

Han et al., "New Configuration of 36-Pulse Voltage Source Converter with Auxiliary Circuit", Electrical Engineering Journal, vol. 88, No. 6, p. 497-507, published on line Dec. 19, 2005.*
Han et al.; "Back-To-Back HVDC System Using a 36-Step Voltage Source Converter", IEE Proc.-Gener. Distrib., vol. 153, No. 6, p. 677-683.*

* cited by examiner

Primary Examiner—Jessica Han
Assistant Examiner—Emily Pham
(74) Attorney, Agent, or Firm—The Webb Law Firm (57) ABSTRACT

A DC power transmission system of a voltage source converter using a pulse-interleaving auxiliary circuit is disclosed. The converter system comprises an IGBT converter for converting an AC power to a DC power or the DC power to the AC power; an open Y-Y transformer and a Y-Δ transformer for stepping up or stepping down the AC power having a predetermined magnitude; a capacitor for dividing a DC voltage; and a DC Auxiliary circuit composed of a normal transformer and half-bridge for overlapping a pulse type input voltage to increase the number of pulses of an output waveform. In using a DC auxiliary circuit composed of normal transformer and 3-level half-bridge to increase the number of pulses of the output waveform by superposing the voltage in the form of the pulse, a normal transformer may be used instead of the tapped transformer to reduce the size thereof and to obtain an accurate transformer ratio, and a 3-level half-bridge may be used instead of the H-bridge to reduce the switching loss.

3 Claims, 13 Drawing Sheets

FIG. 1

PRIOR ART

FIG. 2

PRIOR ART

DC POWER TRANSMISSION SYSTEM OF VOLTAGE SOURCE CONVERTER USING PULSE-INTERLEAVING AUXILIARY CIRCUIT

BACKGROUND OF THE INVENTION

1. Field of the Invention

The present invention relates to a DC power transmission system, and in particular to a DC power transmission system using a voltage source converter with a pulse-interleaving auxiliary circuit comprising a normal transformer and a 3-level half-bridge.

2. Description of Prior Art

Generally, an AC voltage and an AC current being outputted from a generator has a low voltage and a high current. The AC voltage and the AC current are subjected to a long distance power transmission in a form of a low current while maintaining a high voltage using a high voltage transformer or a ultra-high voltage transformer due to a conductor loss by the high current during the power transmission. However, the AC power transmission has a limitation in the long distance power transmission due to an inductance in the power transmission line and a capacitance between a power transmission line and a ground. In order to overcome the above-described limitation, a current source converter for converting AC to DC employing a thyristor having a large capacity was developed, thereby allowing a DC transmission.

Of the above-described DC power transmission, a high-voltage DC (HVDC) transmission system that provides power by converting an AC power generated in a power plant to a DC power to be transmitted and converting back the DC power to the AC power at a receiving point has been widely used. The HVDC transmission system allows an economical power transmission through a step-up of a voltage, which is an advantage of a conventional AC power transmission technology and is also overcoming disadvantages of the conventional AC power transmission technology.

The HVDC system employing thyristor, which has no turn-off capability at the gate, consumes reactive power from the interconnected AC system when it operates. A HVDC system using a voltage source converter, which employs semiconductor switches with gate turn-off capability such as GTO (Gate Turn-Off thyristor) or IGBT (Insulated Gate Bipolar Transistor), does not need reactive-power compensation. On the other hand, it has a capability to compensate the reactive power required in the interconnected AC system.

A voltage source converter used in the HVDC transmission system includes a PWM converter wherein each of switching elements that constitute a single bridge is operated in a PWM mode and a multi-pulse converter that generates an output waveform by combining two or more bridges using transformers.

While the PWM converter has a simple system configuration using the single bridge, a switching loss is large due to multiple switching of each of the switching elements per one AC cycle. Therefore, the PWM converter is not suitable for a large capacity system.

Moreover, while the multi-pulse converter has a small switching loss due to a single switching per AC cycle, the number of pulses should be increased in order to reduce a harmonic level of the output waveform. Therefore, various schemes are used to increase the number of the pulses of the output waveform. The simplest scheme thereof is to increase the number of the bridges of the converter and the number of the transformers coupled to an AC output terminal to increase the number of the pulses. However, this scheme is disadvantageous in that a size of the system is large and a manufacturing cost is high due to the increase in the number of the bridges and the transformers. In order to overcome the disadvantage, an auxiliary transformer is employed between the main transformer and the bridge, maintaining the number of the bridges while increasing the number of the pulses. However, a connection structure of the auxiliary transformer is complex so that a manufacturing process thereof is complicated and a reduction of the manufacturing cost is low.

Figure 1:
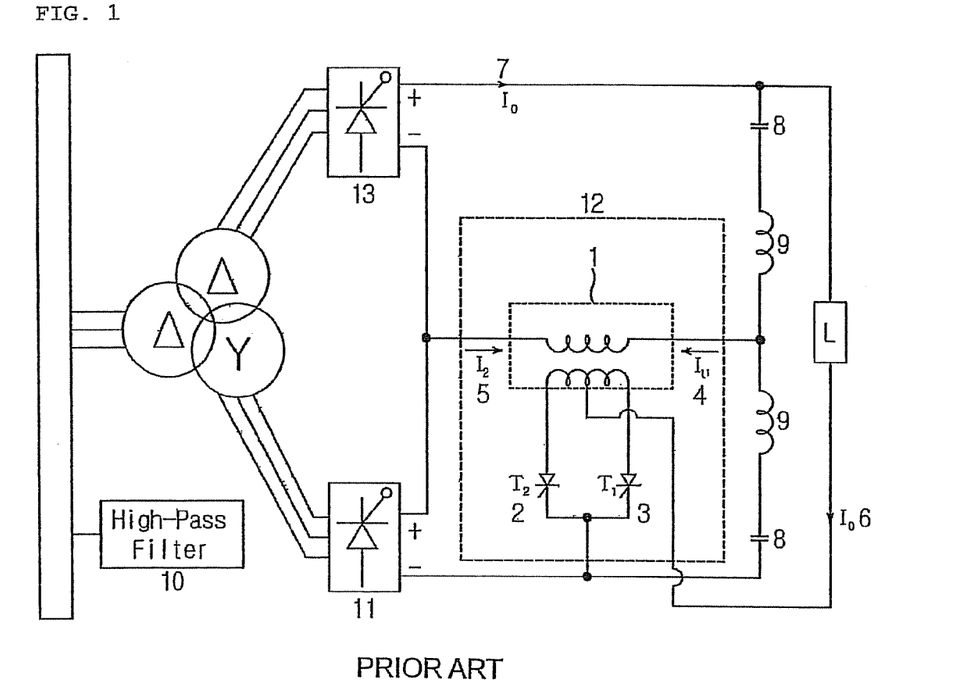
FIG. 1 is a diagram illustrating a conventional multi-pulse DC power transmission system disclosed in Korean Patent No. 10-034614.

Therefore, a method wherein an auxiliary circuit is inserted at a DC stage to superpose a voltage in a form of the pulse on a voltage applied to a DC capacitor to generate the output waveform. FIG. 1 is a diagram illustrating a conventional multi-pulse DC power transmission system disclosed in Korean Patent No. 10-034614.

The system shown in FIG. 1 comprises a multi-winding transformer 1 having a primary winding connected between a connection point of a ground terminal of a first converter 13 and an output terminal of a second converter 11 and a connection point of an output terminal of the first converter 13 and a ground terminal of the second converter 11 so that a difference of output voltages of the first converter 13 and the second converter 11, first and second reactors 9 for rectifying first and second currents connected to one terminal of the multi-winding transformer 1 and output terminals of the second converter 11 and the first converter 13, first and second DC dividing condensers 8, and a plurality of thyristors 2 and 3 respectively connected to a second terminal of the multi-winding transformer 1 wherein one of the plurality of the thyristors become conductive by a rising edge pulse of a primary voltage thereof. The system is manufactured to operate identical to a 24-pulse thyristor HVDC system.

Figure 2:
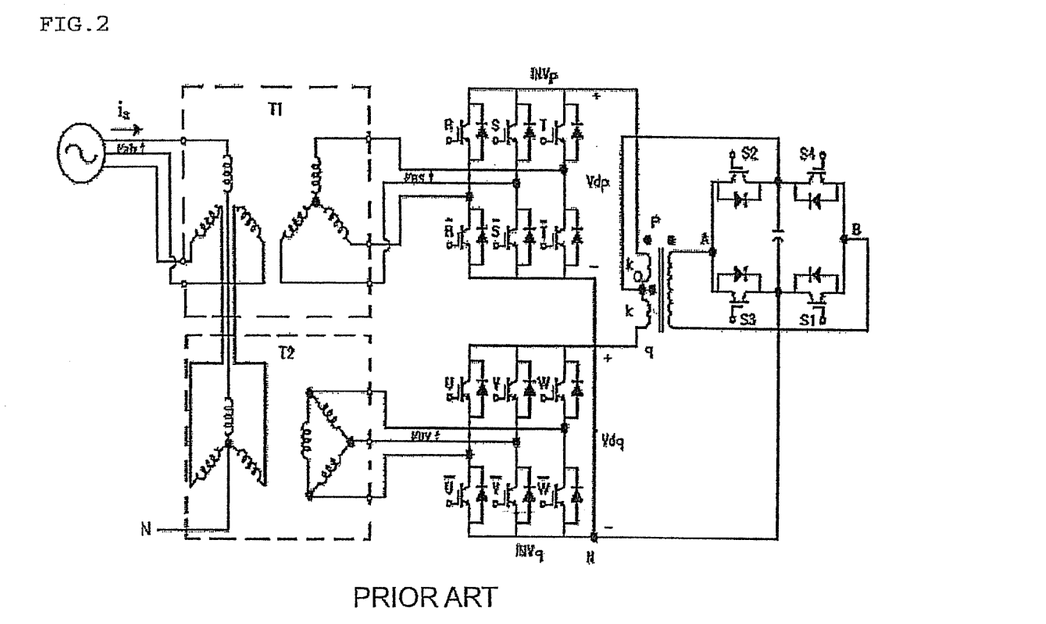
FIG. 2 is a diagram illustrating a conventional 36-step converter using a DC auxiliary circuit.
Figure 3:
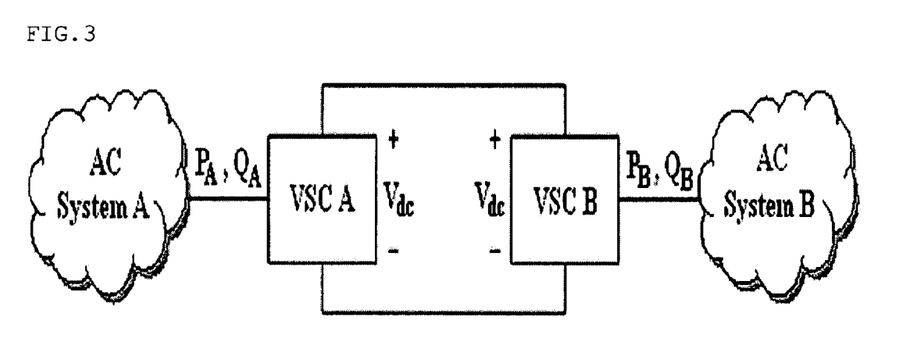
FIG. 3 is a schematic diagram illustrating a back-to-back system.

FIG. 2 is a diagram illustrating another conventional 36-step converter using a DC auxiliary circuit.

The conventional 36-step converter shown in FIG. 2 is a 36-step converter including an auxiliary circuit consisting of an H-bridge and a tapped transformer, and a 12-step converter wherein a voltage generated by combining a voltage of a DC capacitor and a voltage formed by the H-bridge and the tapped transformer is provided to each 6-step bridge. An output voltage generated at each of the 6-step bridges is combined by a three-phase transformer so as to output an output waveform of 36-step.

However, the conventional arts shown in FIGS. 1 and 2 requires a special design and a manufacturing process compared to a normal transformer since the tapped transformer has the large size and a voltage ratio cannot be accurately matched. Moreover, when an inaccuracy of a winding ratio of the tapped transformer results in a lack of a symmetry of the output voltage waveform, thereby generating a harmonic.

On the other hand, the HVDC system may be classified into a point-to-point system which is a DC link type consisting of a cable or an over-head line or a combination thereof, and a back-to-back system wherein the rectifier and an inverter are placed in a converter station. Since the back-to-back system is used to connect two AC systems having different frequencies or connecting a large scale wind power generation plant to a power system, the back-to-back system should be capable of independently controlling active/reactive powers of the two connected AC systems and of controlling a bi-directional power flow. While a magnitude and a phase of an AC output voltage may be independently controlled and the active/reactive powers may also be independently controlled when the voltage source converter operates in the PWM mode, the switching loss is generated when the PWM mode is applied in case of a large capacity voltage source system.

SUMMARY OF THE INVENTION

It is an object of the present invention to provide a converter system wherein a normal transformer and a 3-level half-bridge are used instead of a tapped transformer and an H-bridge respectively, and a back-to-back converter system having the converter system applied thereto so that active and reactive powers of an AC system interconnected to the system are independently controlled.

In order to achieve the above-described objects of the present invention, there is provided a converter system comprising: an IGBT converter for converting an AC power to a DC power or the DC power to the AC power; an open Y-Y transformer and a Y-Δ transformer for stepping up or stepping down the AC power having a predetermined magnitude; a capacitor for dividing a DC voltage; and a DC auxiliary circuit composed of normal transformer and 3-level half-bridge for overlapping a pulse type input voltage to increase the number of pulses of an output waveform.

The IGBT converter comprises a first converter connected to the Y-Y transformer and a second converter connected to the Y-Δ transformer, and wherein the capacitor comprises a first DC capacitor connected to a primary side terminal of a transformer of the DC auxiliary circuit and an output terminal of the first converter, and a second DC capacitor connected to the primary side terminal of the transformer of the DC auxiliary circuit and a ground terminal of the second converter.

In addition, the DC auxiliary circuit comprises a 3-level half-bridge consisting of first through fourth switching element connected to the first DC capacitor and the second DC capacitor in parallel using an IGBT.

Preferably, the transformer of the DC auxiliary circuit comprises a primary side coil and a secondary side coil, the primary side coil being connected between a point where a ground terminal of the first converter and an output terminal of the second terminal are connected and a point where the output terminal of the first converter and the ground terminal of the second converter are connected, and the secondary side coil being connected to the half-bridge such that a difference of output voltages are provided, and wherein the half-bridge of the DC auxiliary circuit comprises a first clamping diode and a second clamping diode, the first clamping diode being connected between a connection point of the first and the second switching elements and a connection point of a second terminal of the primary side coil and a first terminal of the secondary side coil, and the second clamping diode being connected between a connection point of the third and the fourth switching elements and the connection point of the second terminal of the primary side coil and the first terminal of the secondary side coil, whereby a 36-step waveform output voltage is obtained according to a level of a voltage inputted to the transformer of the DC auxiliary circuit.

In order to achieve the above-described objects of the present invention, there is provided a DC transmission system comprising a back-to-back converter wherein the back-to-back converter includes two of the 36-step converter systems, the two of the 36-step converter systems being connected to an AC voltage side in serial and connected to a DC voltage side in parallel.

DETAILED DESCRIPTION OF THE PREFERRED EMBODIMENTS

The present invention will now be described in detail with reference to the accompanied drawings.

Figure 4:
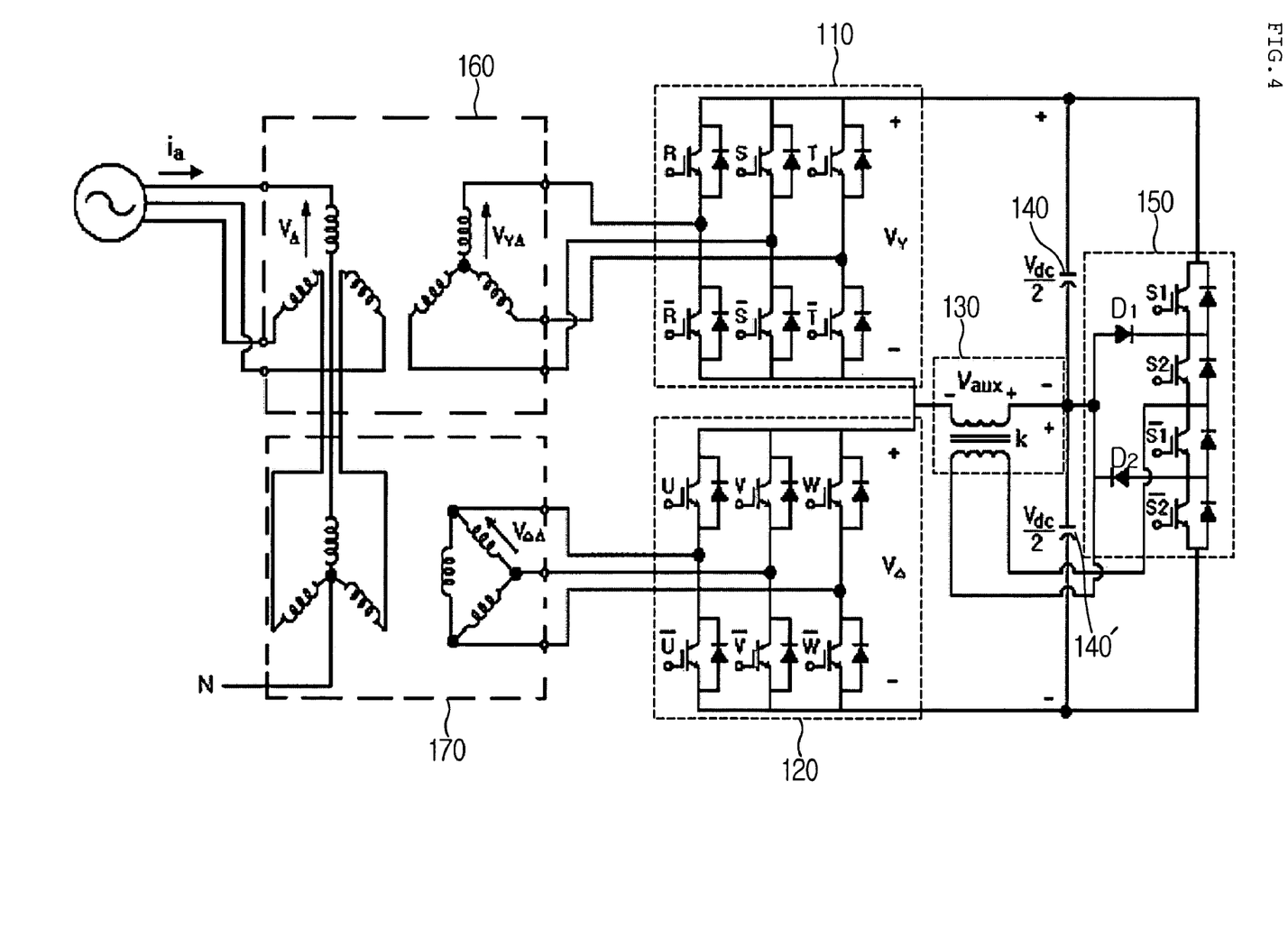
FIG. 4 is a diagram illustrating a 36-step converter using a DC auxiliary circuit in accordance with the present invention.

FIG. 4 is a diagram illustrating a 36-step converter system using a DC auxiliary circuit in accordance with the present invention.

The 36-step converter system shown in FIG. 4 comprises a first converter 110 connected to a Y-Y transformer 160, a second converter 120 connected to a Y-Δ transformer 170, an injection transformer 130, first and second DC capacitors 140 and 140', and a 3-level half-bridge 150.

A negative terminal of the first converter 110 and a positive terminal of the second converter 120 are connected to a first terminal of a primary winding of the injection transformer 130, and a connecting point of the first and second DC capacitors 140 and 140' serially connected between a positive terminal of the first converter 110 and a negative terminal of the second converter 120 is connected to a second terminal of the primary winding of the injection transformer 130.

A first terminal of a secondary winding of the injection transformer 130 is simultaneously connected to the second terminal of the primary winding of the injection transformer 130 and the 3-level half-bridge 150, and a second terminal of the secondary winding of the injection transformer 130 is connected to the 3-level half-bridge 150.

The 3-level half-bridge 150 comprises first through fourth switching elements S1, S2, S1' and S2', using an IGBT for instance, connected to the first and second DC capacitors in parallel, and a clamping diode D1 connected between a connection point of the first and second switching elements S1 and S2 and a connection point of the second terminal of the primary winding and the first terminal of the secondary winding of the injection transformer 130, and a clamping diode D2 connected between a connection point of the third and fourth switching elements S1' and S2' and a connection point of the second terminal of the primary winding and the first terminal of the secondary winding of the injection transformer 130. The second terminal of the secondary winding of the injection transformer 130 is connected to a connection point of the second and third switching elements S2 and S1'.

A characteristic of the converter described above will be described in detail below.

When a bridge of the first and second converters 110 and 120 is assumed to be ideal, voltages of the first and second DC capacitors 140 and 140' of upper and lower bridges are the same. Therefore, DC voltages of the first converter 110 connected to the Y-Y transformer 160 and the second converter 120 connected to the Y-Δ transformer 170 of FIG. 4 may be expressed as equations 1 and 2 where $V_{dc}/2$ is the voltage of the first and second DC capacitors 140 and 140' and $V_{aux}$ is an injection voltage of the 3-level half-bridge 150.

$$V_Y = V_{dc}/2 + V_{aux} \quad \text{[Equation 1]}$$

$$V_\Delta = V_{dc}/2 - V_{aux} \quad \text{[Equation 2]}$$

An output AC voltage of each converter from above equations may be controlled simultaneously by the injection voltage $V_{aux}$. On the other hand, the injection voltage $V_{aux}$ is determined by a switching pattern of the 3-level half-bridge 150 and a winding ratio of the injection transformer 130. Therefore, the injection voltage $V_{aux}$ may have three levels of zero, $k*V_{dc}$, $-k*V_{dc}$, where k is the winding ratio of the injection transformer 130.

Two converter systems connected to the Y-Y transformer 160 and the Y-Δ transformer 170 shown in FIG. 4 generate 12 steps by making a phase voltage of an AC side to have a phase difference of 30°, and the injection voltage $V_{aux}$ forms a step corresponding to a frequency six times larger than a fundamental frequency since the 3-level half-bridge 150 operates at every 30°. The winding ratio k of the injection transformer 130 used in the 3-level half-bridge 150 should be determined such that a harmonic of an output voltage waveform is minimized.

Figure 5:
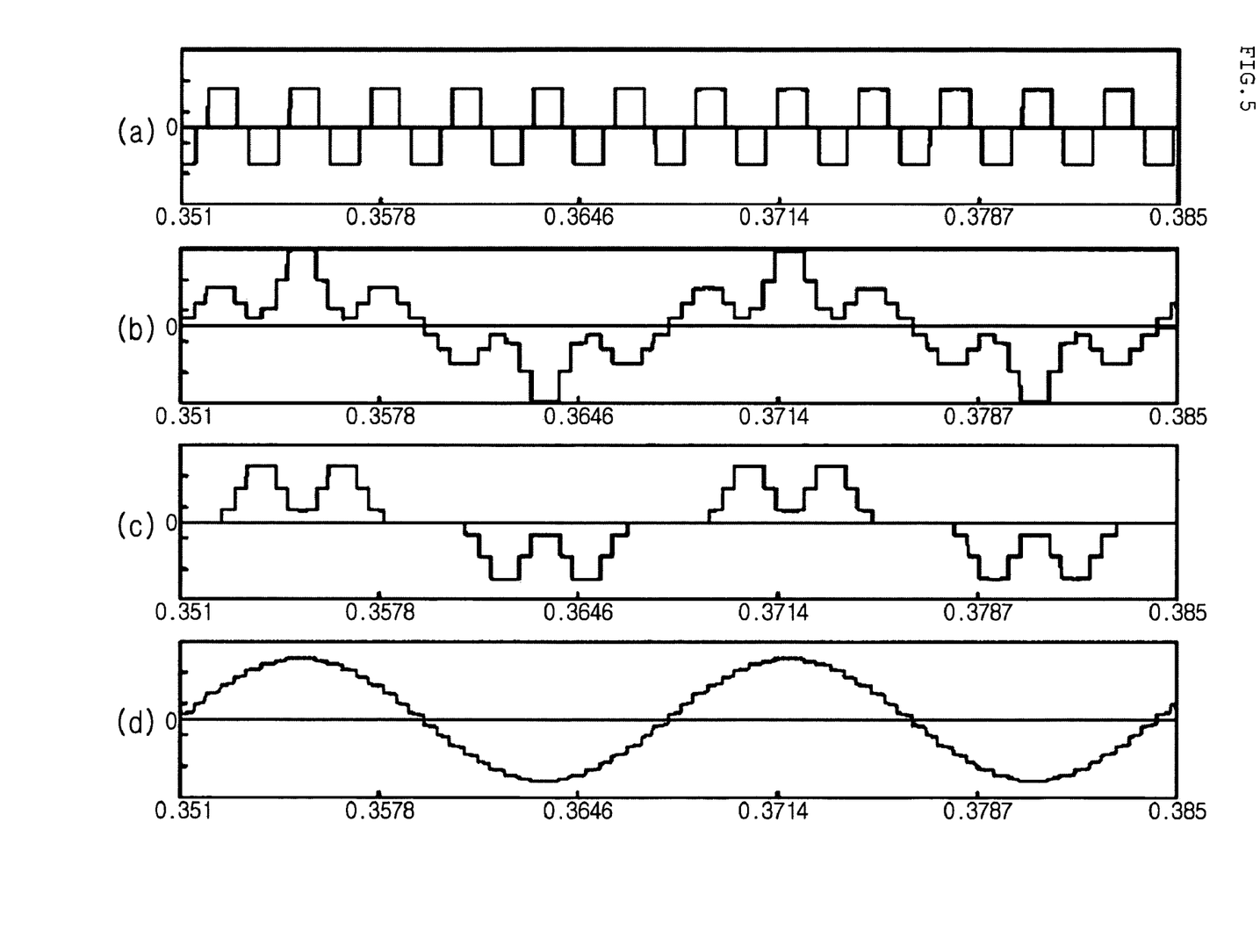
FIG. 5 is a graph illustrating a result of a simulation of an operation of a 36-step converter using a PSCAD/EMTDC software in accordance with the present invention.

FIG. 5 is a graph illustrating a result of a simulation of an operation of a 36-step converter using a PSCAD/EMTDC software in accordance with the present invention.

FIG. 5a illustrates a voltage injected through the transformer from the 3-level half-bridge 150, FIG. 5b illustrates an A-phase voltage $V_{YA}$ of an upper bridge of the first converter 110, and FIG. 5c illustrates an A-phase voltage $V_{\Delta A}$ of a lower bridge of the second converter 120. In accordance with the present invention, a 36-step waveform shown in FIG. 5d is obtained by combining a waveform of the upper bridge of FIG. 5b and a waveform of the lower bridge of FIG. 5c.

The multi-step output voltages $V_{YA}$ and $V_{\Delta A}$ may be expresses as equations 3 and 4 using a Fourier series.

$$V_{YA}(\omega t) = \sum_{n=1}^{\infty} \frac{4}{3}\cos^2\left(\frac{n\pi}{6}\right)b_n V_{dc}\sin(n\omega t) \quad \text{[Equation 3]}$$

$$V_{\Delta A}(\omega t) = \sum_{n=1}^{\infty} \frac{2}{\sqrt{3}}\cos\left(\frac{n\pi}{6}\right)b_n V_{dc}\sin(n\omega t), \quad \text{[Equation 4]}$$

where $b_n = \frac{[1-(-1)^n]}{n\pi}\left\{1 + k\left[8\sin\frac{n\pi}{6}\sin\frac{n\pi}{12}\cos\frac{n\pi}{36} - 1\right]\right\}$ An AC voltage $V_A(\omega t)$ of a primary winding of the transformer is a sum of $V_{YA}(\omega t)$ and $V_{\Delta A}(\omega t)$. Therefore, a total RMS value of an output phase voltage is expressed as equation 5.

$$V_{ARMS} = \frac{V_{dc}}{9}\sqrt{36 + 18\sqrt{3} + (24 - 12\sqrt{3})k^2} \quad \text{[Equation 5]}$$

A fundamental wave peak value is expressed as equation 6.

$$V_{A1} = \frac{4V_{dc}}{\pi}\left[1 + \left(4\cos\frac{\pi}{36}\sin\frac{\pi}{12} - 1\right)k\right] \quad \text{[Equation 6]}$$

Therefore, a $THD_v$ of the output phase voltage is expressed as equation 7.

$$THD_v = \sqrt{\frac{2V_{ARMS}^2}{V_{A1}^2} - 1} \quad \text{[Equation 7]}$$

The winding ratio k of the injection transformer is determined by $$k = 1.5(7 + 4\sqrt{3})\left(4\cos\frac{\pi}{36}\sin\frac{\pi}{12} - 1\right) \approx 0.6547$$

at a minimum value of 5.09% of $THD_v$, which is about 0.6547.

Figure 6:
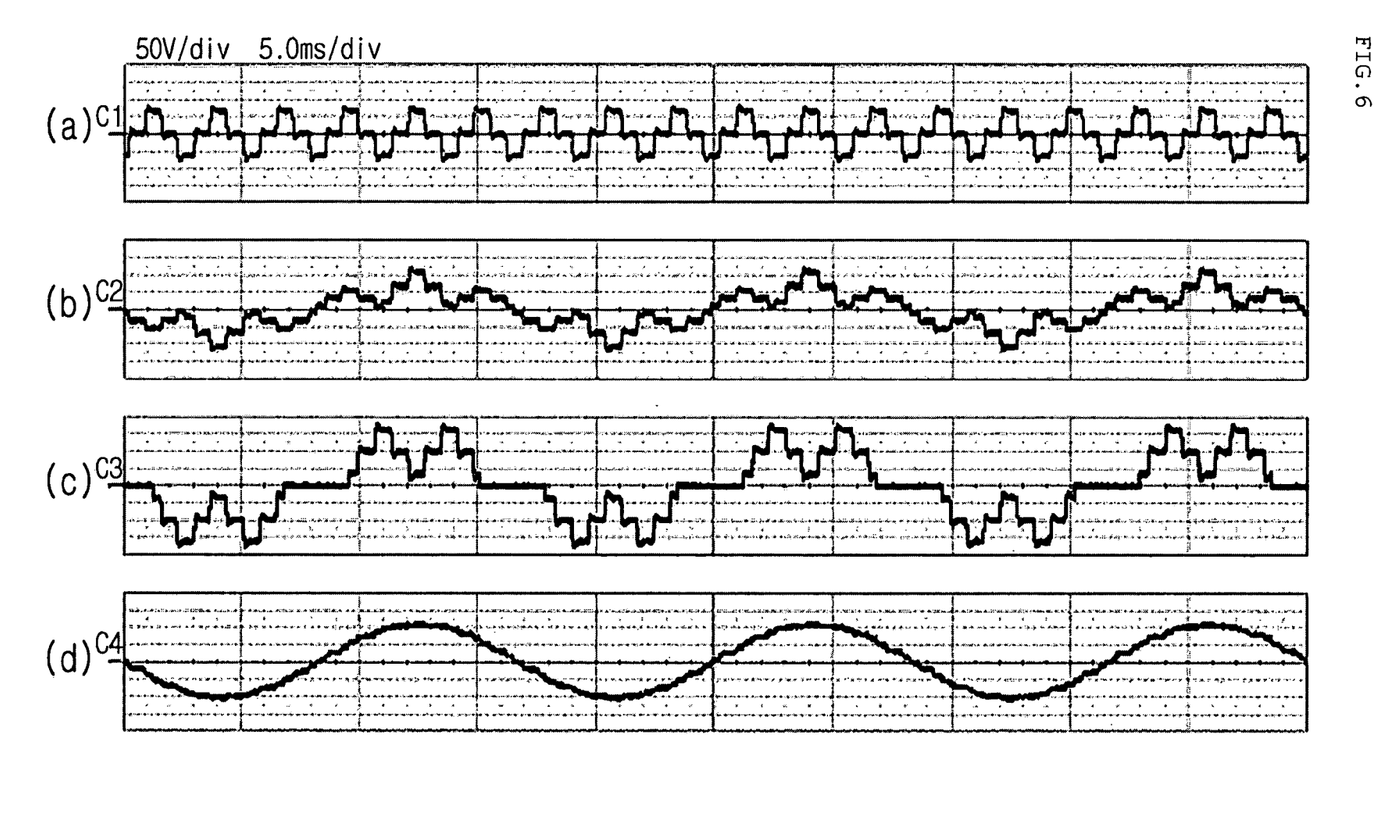
FIG. 6 is a graph illustrating a result of an experiment according to circuit parameters of table 1 using a DSP TMS320VC33 for a control of entire system and a generation of a gate pulse in order to verify an operation and a performance of a 36-step converter in accordance with the present invention.

FIG. 6 is a graph illustrating a result of an experiment according to circuit parameters of table 1 using a DSP TMS320VC33 for a control of entire system and a generation of a gate pulse in order to verify an operation and a performance of a 36-step converter in accordance with the present invention.

TABLE 1

| Source Voltage | 3Φ 220 V |
| --- | --- |
| Frequency | 60 Hz |
| Source Inductance | 2 mH |
| Power Factor | 0.73 |
| Load (R, L) | 20 Ω, 50 mH |
| Load Capacity | 2 kVA |

FIG. 6a illustrates a waveform of an injection voltage of the 3-level half-bridge 150, FIG. 6b illustrates a waveform of the A-phase voltage $V_{YA}$ of the upper bridge of the first converter 110, and FIG. 6c illustrates a waveform of the A-phase voltage $V_{\Delta A}$ of the lower bridge of the second converter 120. FIG. 6d illustrates a combination waveform of the waveform of the A-phase voltage $V_{YA}$ of the upper bridge of the first converter 110 and the waveform of the A-phase voltage $V_{\Delta A}$ of the lower bridge of the second converter 120.

As shown in waveforms of FIG. 6, the entire voltage waveform is very similar to the wave forms of the simulation, and the entire waveform of the output voltage of the converter is close to a sinusoidal wave in spite of a small irregularity.

Figure 7:
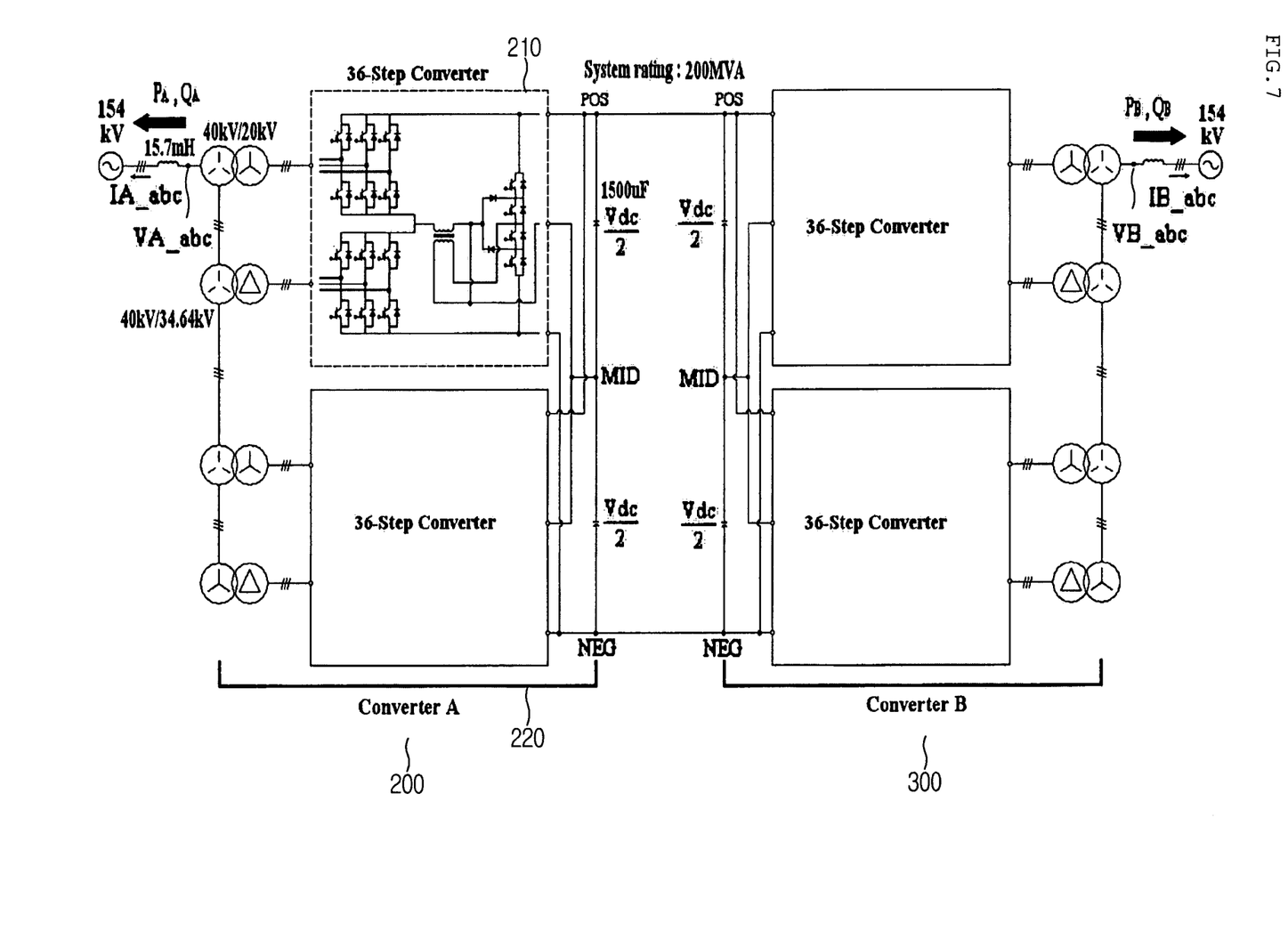
FIG. 7 is a diagram schematically illustrating a back-to-back HVDC system in accordance with the present invention.

FIG. 7 is a diagram schematically illustrating a back-to-back HVDC system in accordance with the present invention.

As shown in FIG. 7, in accordance with the present invention, a back-to-back converter comprising two 36-step converter wherein the AC side thereof is connected in serial and a DC side thereof is connected in parallel.

Figure 8A:
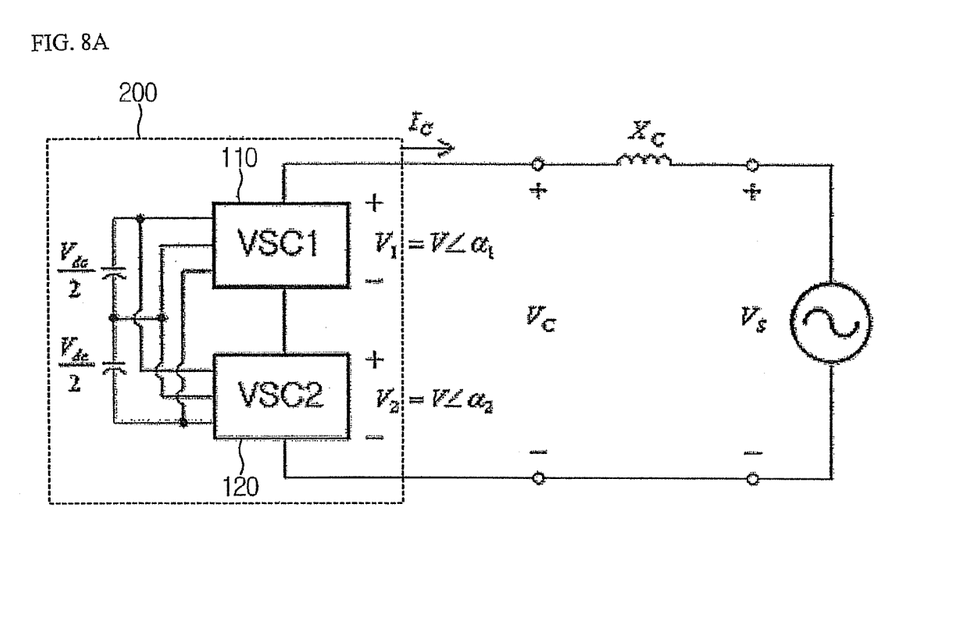
FIG. 8a illustrates a single-phase equivalent circuit of the back-to-back HVDC system of FIG. 7 in accordance with the present invention.

FIG. 8a illustrates a single-phase equivalent circuit of the back-to-back HVDC system of FIG. 7 in accordance with the present invention. The back-to-back converter 200 independently controls effective/reactive powers of an interconnected AC system by operating a firing angle $\alpha_1$ of an upper converter 210 and a firing angle $\alpha_2$ of a lower converter 220 differently.

Figure 8B:
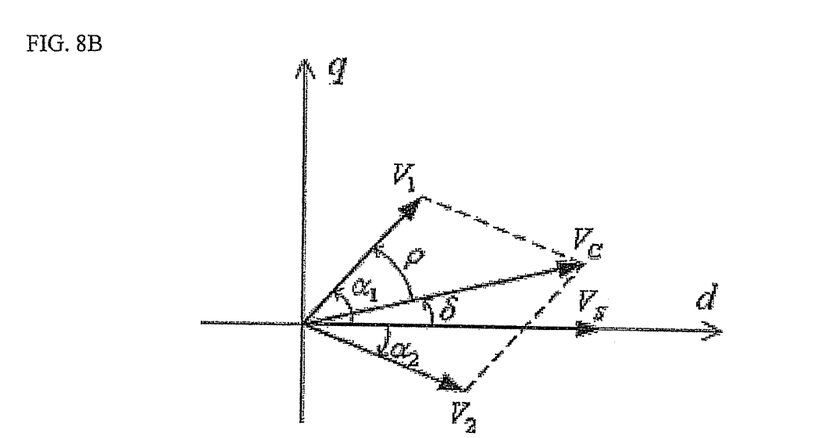
FIG. 8b illustrates a vector diagram illustrating a source voltage, an output voltage of each converter, and a resulting output voltage of the converter, when the upper and lower firing angles of a voltage source converter.

FIG. 8b illustrates a vector diagram illustrating a source voltage, a voltage of each converter, and a total voltage of the converter when the upper and lower firing angles of the voltage source converter are different. As shown in FIG. 8b, when the firing angle $\alpha_1$ of the upper converter 210 and the firing angle $\alpha_2$ of the lower converter 220 are properly adjusted, an output voltage vector Vc of the converter forms a power angle $\delta$ with the source voltage Vs and a magnitude thereof may be adjusted. Therefore, the upper firing angle $\alpha_1$ and the lower firing angle $\alpha_2$ may be adjusted in order to independently control the effective/reactive powers of the interconnected AC system.

Equation related to the firing angles $\alpha_1$ and $\alpha_2$ may be obtained using the vector diagram of the output voltage vector Vc and the power angle $\delta$.

Since $V_C = V_1 + V_2 = V\angle\alpha_1 + V\angle\alpha_2$ in accordance with the vector diagram, and from $$V_C = 2V \cos \rho \quad \text{[Equation 8]}$$

$$\rho = \alpha_1 - \delta = \delta - \alpha_2, \quad \text{[Equation 9]}$$

where $\rho$ denotes an angle between Vc and $V_1$ or Vc and $V_2$.

$\delta$ is express as equation 10.

$$\delta = \frac{\alpha_1 + \alpha_2}{2} \quad \text{[Equation 10]}$$

When a maximum value of Vc assumed to be 1.15 times the Vs, Vc may be expressed as equation 11.

$$V_C = 1.15\, V_S \cos\left(\frac{\alpha_1 - \alpha_2}{2}\right) \quad \text{[Equation 11]}$$

The firing angles $\alpha_1$ and $\alpha_2$ of the converters 210 and 220, which are expressed in equations 12 and 13, are obtained by combining equations 10 and 11 with respect to $\delta$ and Vc.

$$\alpha_1 = \delta + \cos^{-1}\left(\frac{V_C}{1.15 V_S}\right) \quad \text{[Equation 12]}$$

$$\alpha_2 = \delta - \cos^{-1}\left(\frac{V_C}{1.15 V_S}\right) \quad \text{[Equation 13]}$$

The effective/reactive powers in the vector diagram of FIG. 8b are expressed as equations 14 and 15.

$$P = \frac{3 V_C V_S}{X_C} \quad \text{[Equation 14]}$$

$$Q = \frac{3(V_S^2 - V_C V_S \cos\delta)}{X_C} \quad \text{[Equation 15]}$$

By combining equations 14 and 15 with respect to effective/reactive powers and using a solution formula of a second order equation, Vc and $\delta$ may be expressed as equations 16 and 17.

$$V_C = \sqrt{\frac{P^2 X_C^2 + (3V_S^2 - Q X_C)^2}{9 V_S^2}} \quad \text{[Equation 16]}$$

$$\delta = \sin^{-1}\left(\frac{P X_C}{3 V_S V_C}\right), \quad \text{[Equation 17]}$$

where $a = \frac{V_S}{X_C}$ and $b = \frac{1}{X_C}$

Therefore, the firing angles $\alpha_1$ and $\alpha_2$ for given P and Q may be determined by obtaining values of Vc and $\delta$ using equations 16 and 17, and substituting the values into equations 12 and 13.

Figure 9:
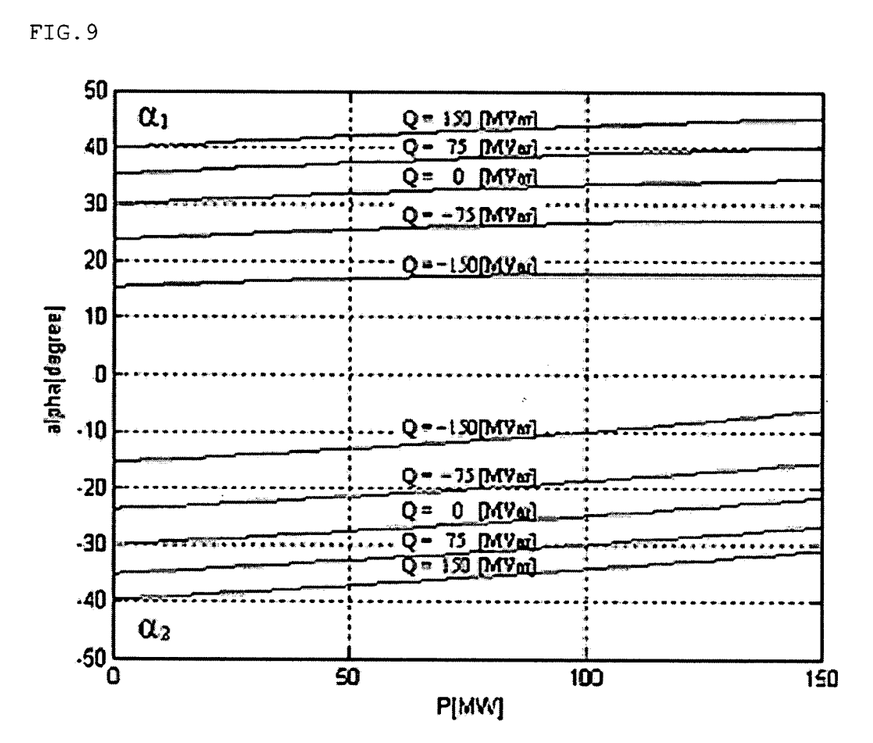
FIG. 9 is a graph illustrating a variation of $\alpha_1$ and $\alpha_2$ with respect to P of table 2 as a function of Q.

Table 2 shows the values of Vc and $\delta$ with respect to P and Q when a line-to-line voltage is assumed to be 154 kV and a coupling inductance is assumed to be 15% at the base rating of 200 MVA. FIG. 9 is a graph illustrating a variation of $\alpha_1$ and $\alpha_2$ with respect to P of table 2 as a function of Q. As shown in FIG. 9, as the reactive power Q shifts from inductive to capacitive value, the values of $\alpha_1$ and $\alpha_2$ moves close to 0o axis.

TABLE 2

|  | | 50 MW | 100 MW | 150 MW |
|---|---|---|---|---|
| −150 | MVar | 1.114 Vs ∠1.93° | 1.120 Vs ∠3.84° | 1.129 Vs ∠5.72° |
| −75 | MVar | 1.058 Vs ∠2.03° | 1.064 Vs ∠4.04° | 1.074 Vs ∠6.01° |
| 0 | MVar | 1.002 Vs ∠2.14° | 1.008 Vs ∠4.27° | 1.019 Vs ∠6.34° |
| 75 | MVar | 0.946 Vs ∠2.27° | 0.953 Vs ∠4.52° | 0.964 Vs ∠6.70° |
| 150 | MVar | 0.890 Vs ∠2.42° | 0.897 Vs ∠4.80° | 0.909 Vs ∠7.11° |

As described above, the back-to-back converter 200 consisting of two 36-step converter in accordance with the present invention allows the effective/reactive powers of the interconnected AC system to be controlled independently.

A system operation characteristic and a performance analysis of a controller will now be described using PSCAD/EMTDC for the embodiment of FIG. 7 in accordance with the present invention.

Figure 10:
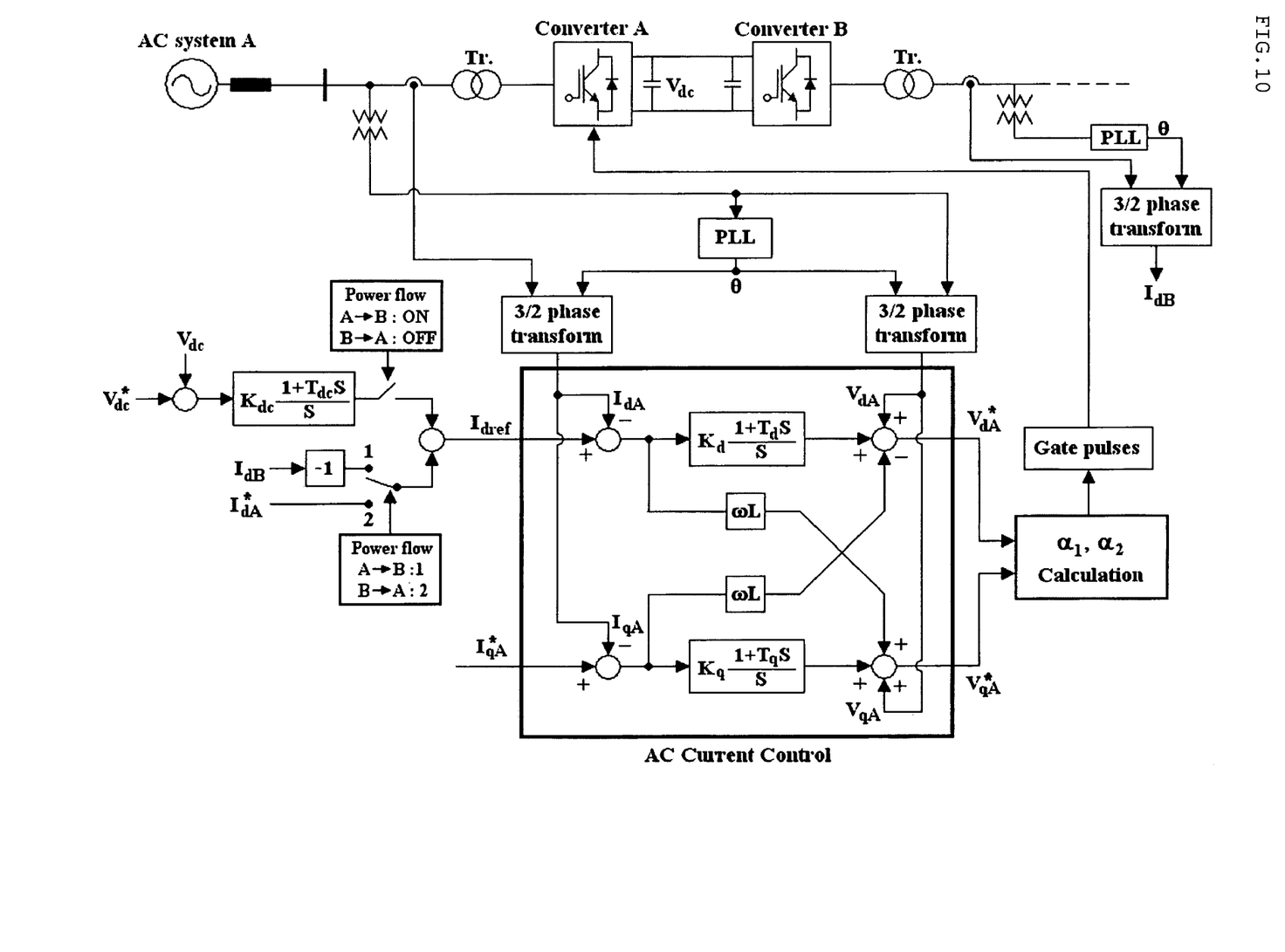
FIG. 10 is a block diagram illustrating a configuration of a controller of each converter.

A power circuit in accordance with the embodiment is embodied using circuit elements, switches and transformers. The controller, which is shown in FIG. 10, is embodied using a built-in controller module. Table 3 shows circuit parameters used in the simulation for the embodiment.

TABLE 3

| Source Voltage | 3Φ 154 kV, 60 Hz |
|---|---|
| Source Inductance | 15.7 mH |
| DC capacitor | 1500 uF |
| Phase transformer | 40 kV/20 kV(Y—Y) |
|  | 40 kV/34.64 kV(Y-Δ) |
| Auxiliary transformer | 32.7 kV/50 kV |
| System rating | 200 MVA |

A voltage source HVDC system operates by adjusting a magnitude of a terminal voltage applied to both terminals of the converter for controlling the firing angles, and changing a direction of power. That is, when the power is transmitted from the converter A 200 to the converter B 300 in FIG. 7, the converter A constantly performs a DC voltage control and a reactive power control. When the power is transmitted from the converter B 300 to the converter A 200, an opposite control scheme is performed. Therefore, the controller of each converter has an identical configuration as shown in FIG. 10.

When the converter A 200 transmits the power to the converter B 300, a measured value of DC voltage $v_{dc}$ follows a reference value $v_{dc}^*$. A reference value of an effective current $I_{dA}^*$ is obtained from a measured value of an effective current $I_{dB}$ in the converter B. Measured values of a reactive current $I_{qA}$ and an effective current $I_{dB}$ follow a reference value $I_{qA}^*$ and $I_{dB}^*$ through a control algorithm. An AC current controller has an identical configuration to that of the converter generally used in the controller. Reference values of a d-q transformed AC system voltage $v_{dA}^*$ and $v_{qA}^*$ are used to determine the values of $V_C$ and $\delta$. The values of $\alpha_1$ and $\alpha_2$ are obtained from $V_C$ and $\delta$ using the relationship described in equations 12 and 13.

Table 4 shows a simulation scenario used in an operation analysis of the back-to-back converter in accordance with the present invention.

TABLE 4

| | Mode | | | | | | | | |
|---|---|---|---|---|---|---|---|---|---|
| | M1 | M2 | M3 | M4 | M5 | M6 | M7 | M8 | M9 |
| Time(sec) | 0.5~1.0 | 1.0~1.5 | 1.5~2.0 | 2.0~2.5 | 2.5~3.0 | 3.0~3.5 | 3.5~4.0 | 4.0~4.5 | 4.5~5.0 |
| Vdc*[kV] | | | | | 60 | | | | |
| idA*[A] | | | | Vdc control | | | | 330 | 660 |
| iqA*[A] | | | | 0 | | | | −500 | 500 |
| idB*[A] | 0 | 330 | 330 | 660 | 660 | 990 | 990 | Vdc control | |
| iqB*[A] | 0 | −950 | 950 | 950 | −500 | −500 | 500 | 0 | |
| PA[MW] | 0 | −50 | −50 | −100 | −100 | −150 | −150 | 50 | 100 |
| QA[Mvar] | | | | 0 | | | | −75 | 75 |
| PB[MW] | 0 | 50 | 50 | 100 | 100 | 150 | 150 | −50 | −100 |
| QB[Mvar] | 0 | −150 | 150 | 150 | −75 | −75 | 75 | 0 | |

The controller is in operation in 0.5 sec after the simulation starts. It is assumed that the direction of the power is from the system A 200 to the system B 300 between 0.5 sec and 4.0 sec, and the direction is changed from the system B 300 to the system A 200 at 4.0 sec. In addition, the reference values of effective and reactive power are varied according to each of the operation modes from M1 to M9 shown in Table 4 in order to analyze a control performance of the effective and reactive powers.

FIGS. 11a through 11g illustrate a result of the simulation for verifying the operation of the entire system in accordance with the present invention.

Figure 11A:
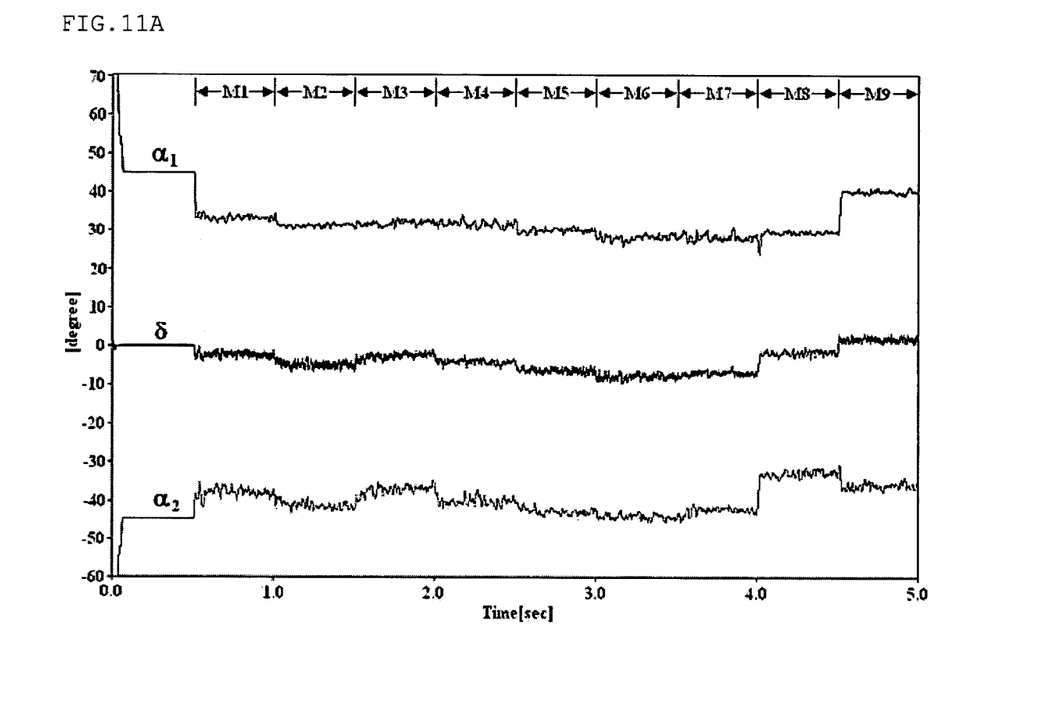
FIG. 11 is a graph illustrating a result of a simulation for verifying an operation of an entire system in accordance with the present invention.
Figure 11B:
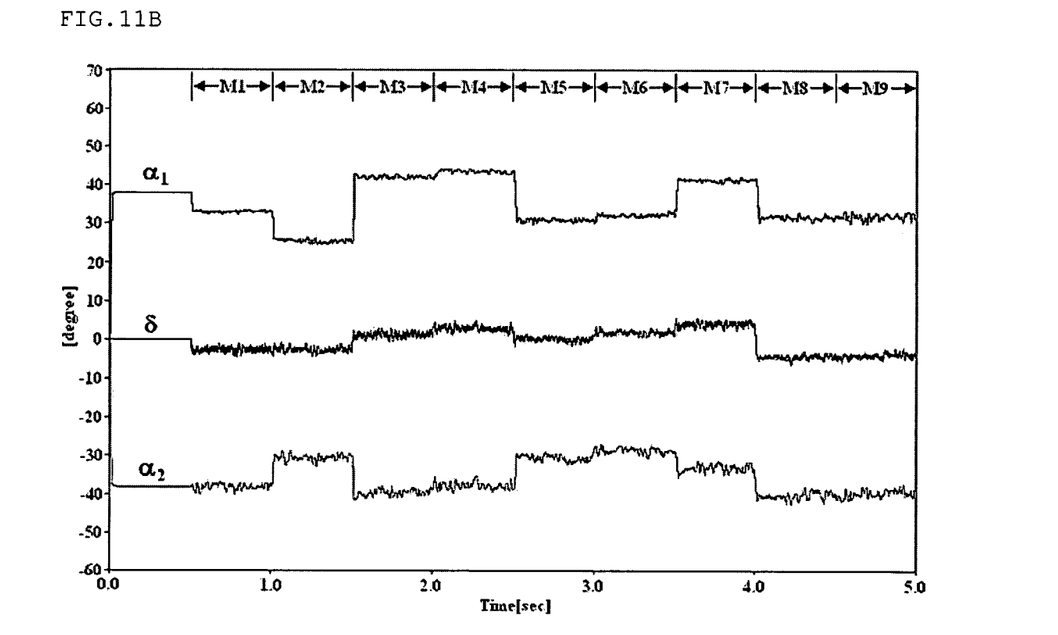

The controllers of the system A 200 and the system B 300 have the same structure, and the control parameters have same values with opposite sign. FIG. 11a shows variations of the power angle $\delta$, the upper firing angle $\alpha_1$ and the lower firing angle $\alpha_2$ of the output voltage of the converter A 200, while FIG. 11b shows variations of the power angle $\delta$, the upper firing angle $\alpha_1$ and the lower firing angle $\alpha_2$ of the output voltage of the converter B 300. The values of $\alpha_1$ and $\alpha_2$ correspond with those shown in FIG. 9 and the value of $\delta$ corresponds to that shown in Table 2.

Figure 11C:
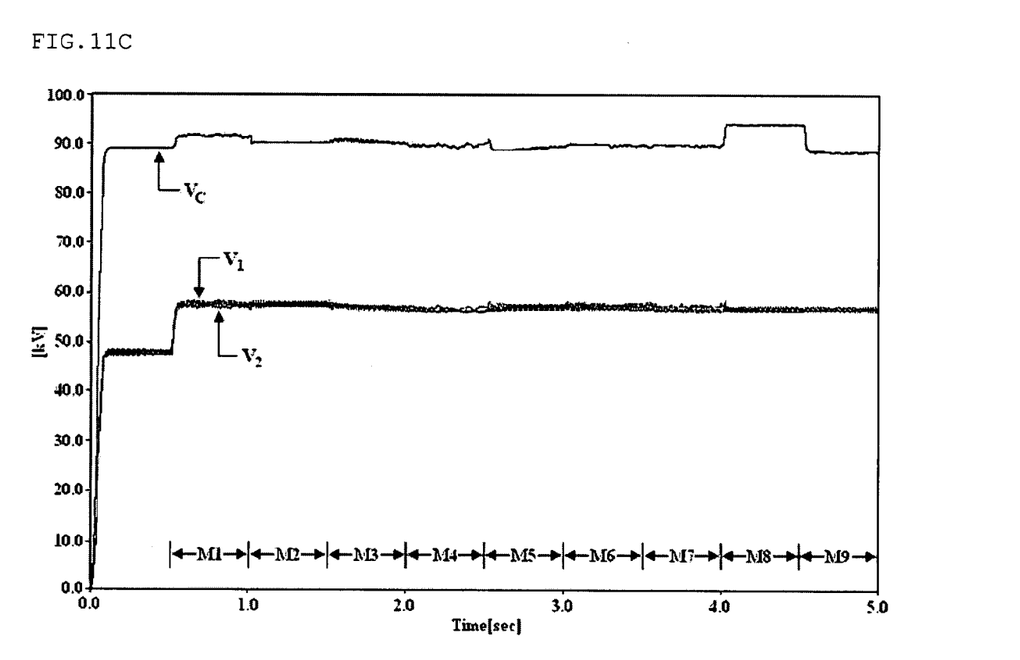
Figure 11D:
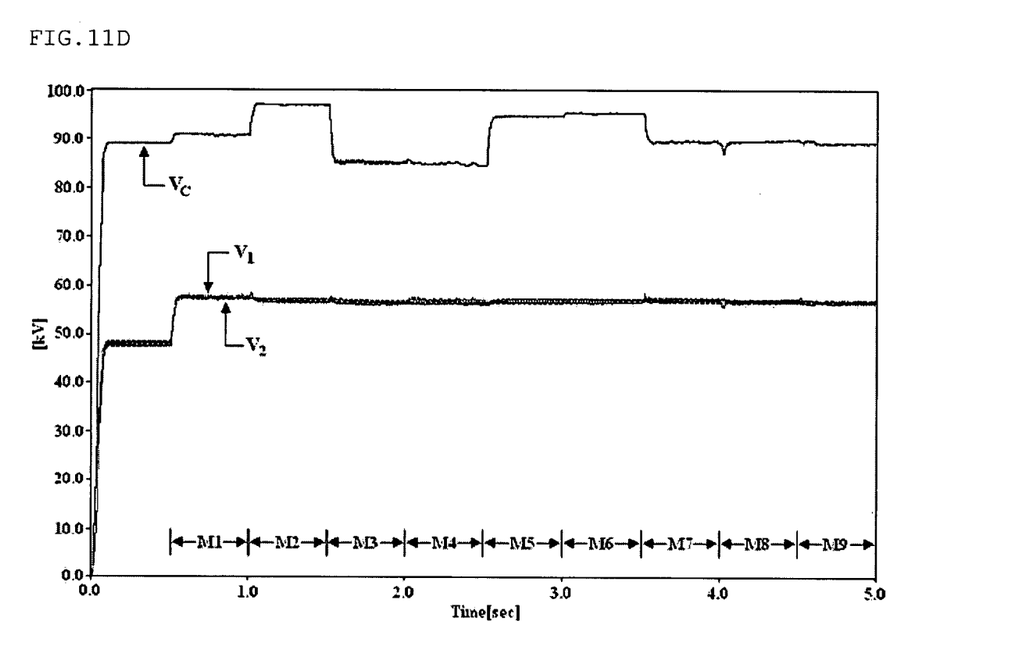
Figure 11E:
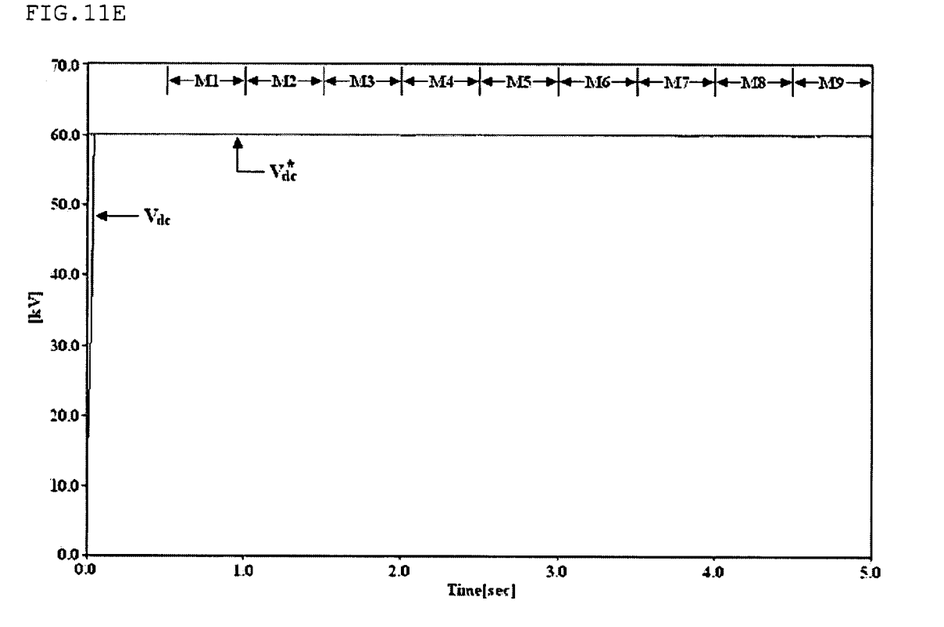
Figure 11F:
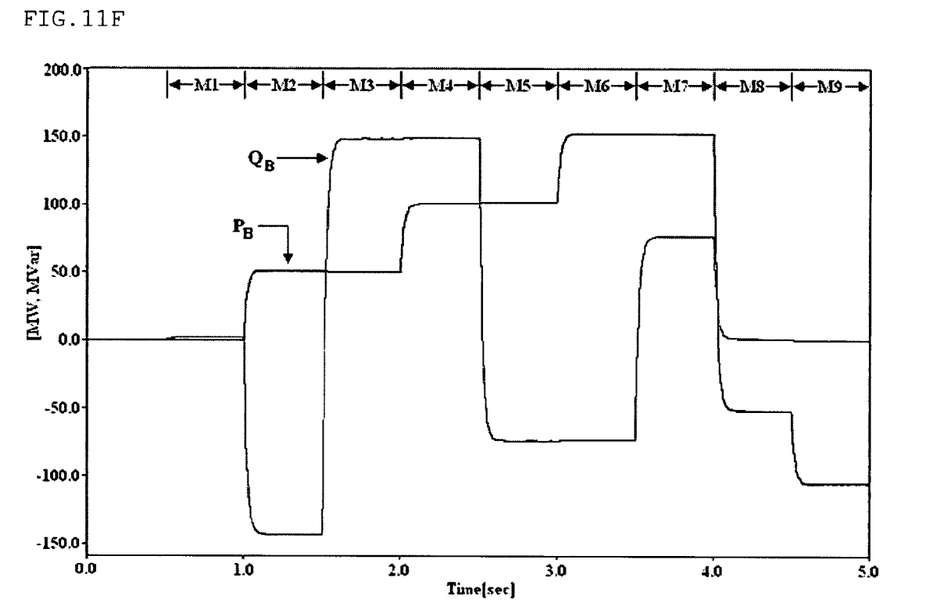
Figure 11G:
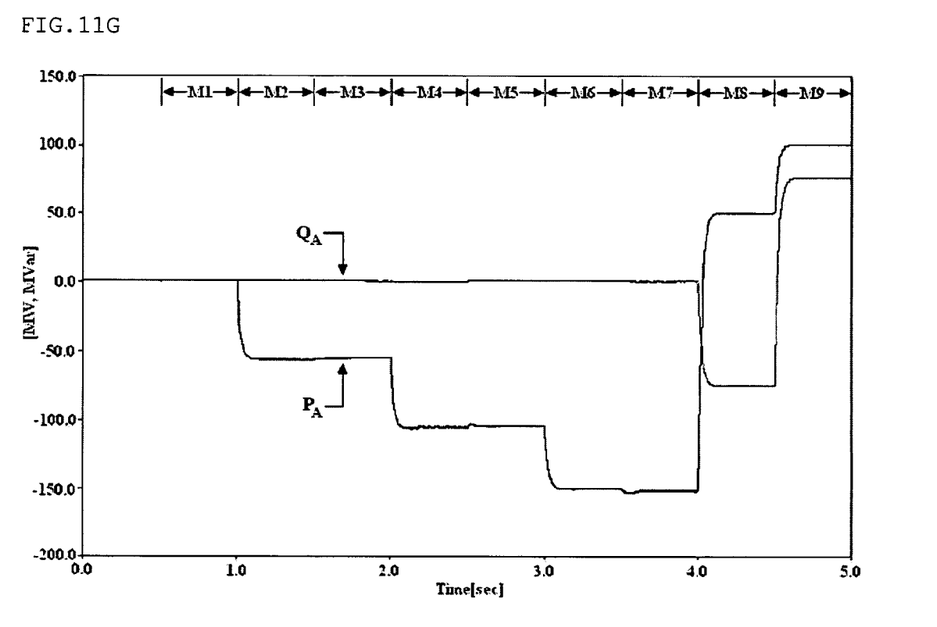

FIG. 11c shows a variation of an RMS value of the output voltage and a superposed output voltage of the converter A 200, and FIG. 11d shows a variation of an RMS value of the output voltage and a superposed output voltage of the converter B 300. The value of $V_c$, which is a vector sum of $V_1$ and $V_2$, corresponds with that of Table 2. FIG. 11e shows the control performance of a DC link voltage. The DC link voltage is initially charged to 60 kV so that the system may be in operation at 0.5 sec. A measured value of DC link voltage tracks a reference value of 60 kV without excessive transients. FIG. 11f shows a variation of the effective and reactive powers transmitted from the converter B 300 to the AC system B. It is verified that the effective and reactive powers to the system B may be independently controlled. FIG. 11g shows a variation of the effective and reactive powers transmitted from the AC system A to the converter A 200. The value of the effective power is the same as that of FIG. 11f, while the reactive power has a different value since each controller carries out the independent control. Therefore, it may be verified that the DC transmission system in accordance with the present invention is capable of the independent control for the effective and reactive powers.

While the DC transmission system in accordance with the present invention has been particularly shown and described with reference to the preferred embodiment thereof, it will be understood by those skilled in the art that various changes in form and details may be effected therein without departing from the spirit and scope of the invention.

As described above, in accordance with the present invention, in using a transformer and bridge auxiliary circuit to increase the number of pulses of the output waveform by superposing the voltage in the form of the pulse, a normal transformer is used instead of the tapped transformer to reduce the size thereof and to obtain an accurate transformer ratio, and a 3-level half-bridge is used instead of the H-bridge to reduce the switching loss.

Moreover, the back-to-back converter system consisting of two 36-step converters allows the independent control of the effective and reactive powers of the connected AC systems.

The invention claimed is:

1. A converter system comprising:
    an IGBT converter for converting an AC power to a DC power or the DC power to the AC power;
    an open Y-Y transformer and a Y-Δ transformer for stepping up or stepping down the AC power having a predetermined magnitude;
    a capacitor for dividing a DC voltage; and
    a DC auxiliary circuit comprising a normal transformer and a half-bridge for overlapping a pulse type input voltage to increase the number of pulses of an output waveform,
    wherein the IGBT converter comprises a first converter connected to the Y-Y transformer and a second converter connected to the Y-Δ transformer,
    the capacitor comprises a first DC capacitor connected between a primary side terminal of the transformer of the DC auxiliary circuit and a positive terminal of the first converter, and a second DC capacitor connected between the primary side terminal of the transformer of the DC auxiliary circuit and a negative terminal of the second converter, and the half-bridge of the DC auxiliary circuit comprises a 3-level half-bridge consisting of first through fourth switching elements connected to the first DC capacitor and the second DC capacitor in parallel and connected to secondary side terminals of the transformer.

2. The converter system in accordance with claim 1, wherein the transformer comprises a primary side coil and a secondary side coil, the primary side coil being connected between a point where a negative terminal of the first converter and a positive terminal of the second terminal are connected and a point where the positive terminal of the first converter and the negative terminal of the second converter are connected, and the secondary side coil being connected to the 3-level half-bridge such that a difference of output voltages are provided, wherein the 3-level half-bridge comprises a first clamping diode and a second clamping diode, the first clamping diode being connected between a connection point of the first and the second switching elements and a connection point of a second terminal of the primary side coil and a first terminal of the secondary side coil, and the second clamping diode being connected between a connection point of the third and the fourth switching elements and the connection point of the second terminal of the primary side coil and the first terminal of the secondary side coil, and wherein a second terminal of the secondary side coil is connected to a connection point of the second and the third switching elements.

3. A DC transmission system comprising a back-to-back converter wherein the back-to-back converter includes two of the converter systems in accordance with claim 2, the two of the converter systems being connected to an AC voltage side in serial and connected to a DC voltage side in parallel.

* * * * *